United States Patent [19]
Brakebill

[11] 4,239,181
[45] Dec. 16, 1980

[54] VALVE POSITIONER AND METHOD OF MAKING THE SAME

[75] Inventor: Harold G. Brakebill, Concord, Tenn.

[73] Assignee: Robertshaw Controls Company, Richmond, Va.

[21] Appl. No.: 908,209

[22] Filed: May 22, 1978

[51] Int. Cl.[3] ...................... F16K 31/126; F01B 19/00; F02M 25/06

[52] U.S. Cl. .................................. 251/61.5; 123/568; 92/49

[58] Field of Search ....................... 251/61, 61.5, 61.2, 251/61.4; 123/119 A; 92/48-50

[56] References Cited

U.S. PATENT DOCUMENTS

| | | | |
|---|---|---|---|
| 3,565,109 | 2/1971 | Smith | 137/595 |
| 3,800,765 | 4/1974 | Thompson | 123/119 A |
| 3,834,366 | 9/1974 | Kingsbury | 123/119 A |
| 4,009,700 | 3/1977 | Engels et al. | 123/119 A |
| 4,056,083 | 11/1977 | Wakita | 123/119 A |
| 4,120,480 | 10/1978 | Ando et al. | 251/61.5 |
| 4,163,543 | 8/1979 | Cook | 251/61.5 |

*Primary Examiner*—Martin P. Schwadron
*Assistant Examiner*—A. Michael Chambers
*Attorney, Agent, or Firm*—Candor, Candor & Tassone

[57] ABSTRACT

A self-contained valve positioner having a single valve positioner housing including an actuator portion and having a pneumatically operated actuator unit therein carrying a main valve member to position the main valve member relative to a main valve seat in a valve unit in relation to the magnitude of a single pneumatic signal directed to the valve positioner and being utilized as the fluid source therein for pneumatically operating the actuator unit, the actuator unit having structure in the housing to cause the actuator unit to progressively open the valve member as the signal being directed to the valve positioner progressively increases from a first value to a second value and thereafter to progressively close the valve member as the signal being directed to the valve positioner progressively increases from the second value to a third value.

2 Claims, 2 Drawing Figures

VALVE POSITIONER AND METHOD OF MAKING THE SAME

BACKGROUND OF THE INVENTION

1. Field of the Invention

This invention relates to an improved self-contained pneumatically operated valve positioner and to a method of making the same.

2. Prior Art Statement

It was known to applicant to provide a vacuum operated valve positioner for positioning a valve member relative to a valve seat in relation to the magnitude of a pneumatic signal directed to the positioner.

It was also known to applicant that engine control systems for internal combustion engines have been provided wherein each has an exhaust gas recirculation valve for taking part of the exhaust gas of the internal combustion engine and diverting the same into the intake manifold to be again utilized in the internal combustion engine for pollution control purposes. However, the degree of exhaust gas recirculation must be regulated according to various engine parameters, such as the RPM speed of the engine, the value of the manifold absolute pressure, etc., and it was suggested by others that it would be desirable to provide such a control system wherein the exhaust gas recirculation valve is pressure operated and pneumatically operated control means is provided for increasing a pressure signal from the engine air pump pressure supply to the valve as the engine RPM speed increases from a first value to a second value and for thereafter decreasing the pressure signal from the supply to the valve as the engine RPM speed further increases from the second value thereof to a third value, the control means producing the signal in substantially the same manner but at different values for different levels of vacuum at the manifold vacuum source thereof.

Thus, applicant previously invented such a control system and device as described and claimed in the copending patent application, Ser. No. 800,211, filed May 25, 1977, now U.S. Pat. No. 4,099,539 to control the operation of a pressure operated valve positioner as set forth in applicant's other copending patent application, Ser. No. 800,299, filed May 25, 1977, now U.S. Pat. No. 4,143,850.

However, it was subsequently suggested to applicant that it was desired to have such an exhaust gas recirculation valve be regulated only according to one engine parameter, namely, the value of the manifold absolute pressure and it was further suggested that manifold vacuum operate part of the valve positioner and that carburetor port vacuum operate another part of the valve positioner so that both parts would cooperate together to produce the desired operation.

Therefore, rather than use the above suggested two separate pneumatic sources, applicant has invented a pneumatically operated valve positioner that operates only in response to one pneumatic signal source and which will function for the above purpose.

SUMMARY OF THE INVENTION

It is a feature of this invention to provide a self-contained valve positioner that will progressively open a valve member relative to its valve seat as a pneumatic signal to the valve positioner increases from a first value to a second value and thereafter will progressively close the valve member relative to its valve seat as the same pneumatic signal to the valve positioner progressively increases from that second value to a third value thereof.

In particular, such a valve positioner is adapted to be an exhaust gas recirculation valve unit for an internal combustion engine wherein the pneumatic signal being directed thereto is taken from the vacuum manifold of the engine so that as the vacuum value changes from a first value thereof to a second value thereof, the valve unit progressively opens to direct engine exhaust gas back to the engine at a rate in relation to the vacuum value at the vacuum manifold. However, as the vacuum value changes from that second value thereof to a third value thereof, the valve member of the valve unit will progressively close toward its valve seat to reduce the rate of exhaust gas recirculation to the engine for the reasons fully set forth in the aforementioned copending U.S. patent applications.

Thus, one embodiment of this invention provides a self-contained valve positioner having a single valve positioner housing including an actuator portion and having a pneumatically operated actuator means therein carrying a main valve member to position the main valve member relative to a main valve seat in a valve unit in relation to the magnitude of a single pneumatic signal directed to the valve positioner and being utilized as a fluid source therein for pneumatically operating the actuator means, the actuator means having means to cause the actuator means to progressively open the valve member as the signal being directed to said valve positioner progressively increases from a first value to a second value and thereafter to progressively close the valve member as the signal being directed to said valve positioner progressively increases from the second value to a third value.

Accordingly, it is an object of this invention to provide an improved self-contained valve positioner having one or more of the novel features of this invention as set forth above or hereinafter shown or described.

Another object of this invention is to provide a method of making such a self-contained valve positioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
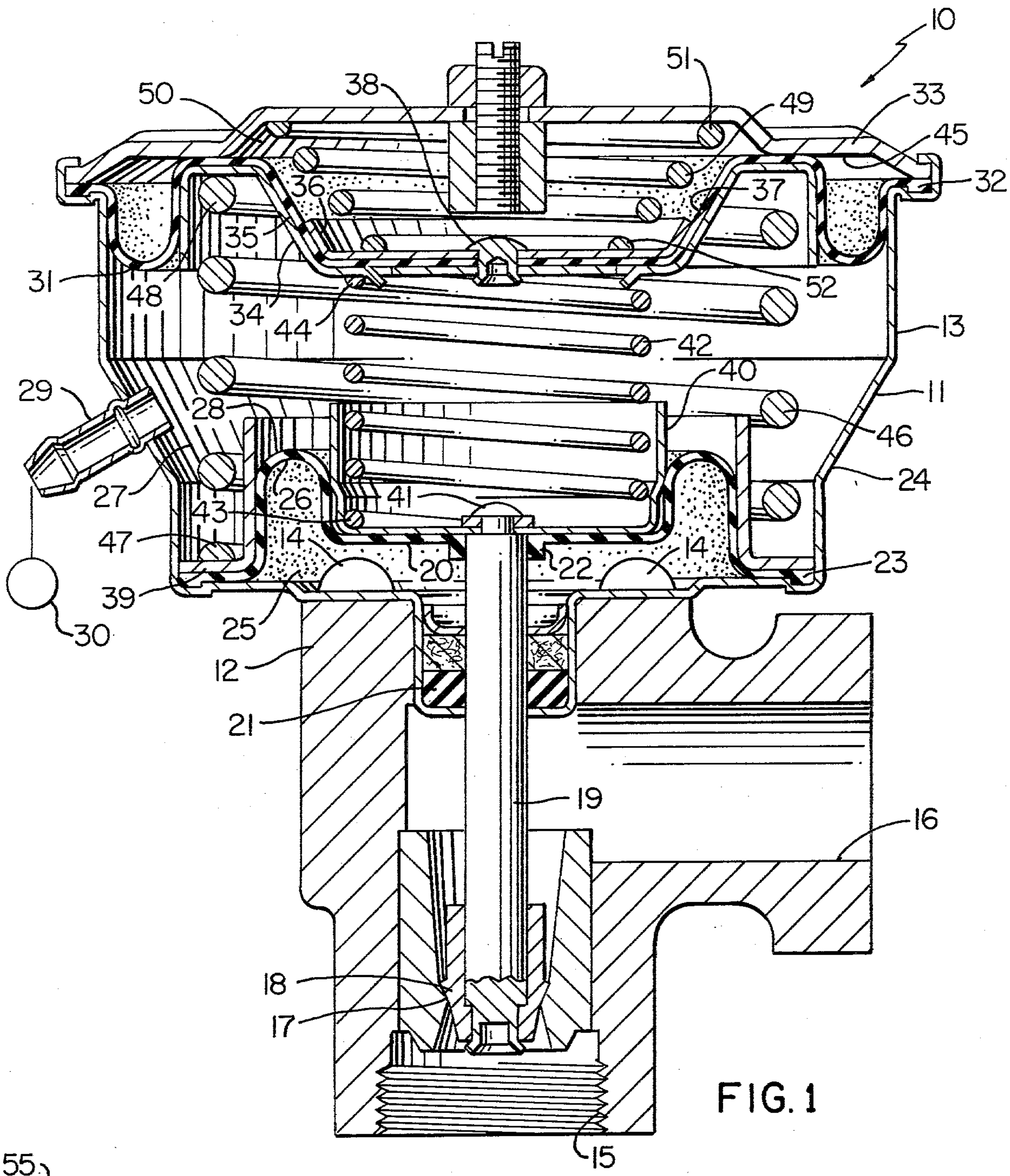
FIG. 1 is a cross-sectional view illustrating the improved valve positioner of this invention.

While the various features of this invention are hereinafter described and illustrated as being particularly adapted to provide a valve positioner to be utilized as an exhaust gas recirculation valve means for an internal combustion engine, it is to be understood that the various features of this invention can be utilized singly or in any combination thereof to provide a valve positioner for other devices as desired.

Therefore, this invention is not to be limited to only the embodiment illustrated in the drawings, because the drawings are merely utilized to illustrate one of the wide variety of uses of this invention.

Referring now to FIG. 1, the improved valve positioner of this invention is generally indicated by the reference numeral 10 and comprises a housing means 11 formed from a valve unit 12 and a pneumatically operated actuator unit 13 suitably secured together, such as by fastening means 14.

The valve unit 12 has an inlet 15 separated from an outlet 16 by a frusto-conical valve seat 17 adapted to be opened and closed by a main valve member 18 carried by a valve stem or actuator rod 19 that is secured to a flexible diaphragm 20 of the actuator unit 13 so that opening and closing movement of the valve member 18 relative to the valve seat 17 is determined by the position of the diaphragm 20 in the actuator unit 13 in a manner hereinafter set forth, the valve stem 19 passing through suitable seal means 21 carried by the valve unit 12.

The flexible diaphragm 20 has its inner periphery 22 secured to the valve stem 19 and its other periphery 23 secured to the housing part 24 of the actuator unit 13 whereby the diaphragm 20 cooperates with the housing part 24 to define a chamber 25 on one side 26 of the diaphragm 20 and another chamber 27 on the other side 28 of the diaphragm 20, the chamber 25 being adapted to be interconnected to the atmosphere in any well known conventional manner while the chamber 27 is adapted to be interconnected by an inlet fitting 29 to a pneumatic source, such as the vacuum manifold 30 of an internal combustion engine as illustrated in FIG. 1 and for a purpose hereinafter described.

The actuator unit 13 includes another flexible diaphragm 31 that has its outer peripheral portion 32 secured between the housing part 24 and a cover housing part 33 whereby the diaphragm 31 cooperates with the diaphragm 20 to define the actuating chamber 27 therebetween.

The diaphragm 31 carries a diaphragm cup or reinforcing member 34 on one side 35 thereof and another diaphragm cup or reinforcing member 36 on the side 37 thereof, the diaphragm cups or reinforcing means 34 and 36 being secured together by suitable rivet means 38 as illustrated.

The diaphragm 20 also carries a pair of diaphragm cups or reinforcing means 39 and 40 on the side 28 thereof, the diaphragm cup 40 being secured to the valve stem 19 by a suitable rivet end 41 of the stem 19 as illustrated while the diaphragm cup 39 is secured to the housing part 24 so as to hold the peripheral portion 23 of the diaphragm fixed from movement.

A first coiled compressing spring 42 is disposed in the chamber 27 of the actuator unit 13 and has one end 43 bearing against the diaphragm cup 40 while the other end 44 thereof bears against the diaphragm cup 34 whereby the force of the compression spring 42 operatively acts respectively on the flexible diaphragms 20 and 31 in a manner to tend to urge the upper diaphragm 31 against a stop surface 45 of the housing part 33 as illustrated in FIG. 1 and the diaphragm 20 downwardly to the position illustrated in FIG. 1 where the main valve member 18 is fully closed against the main valve seat 17 as illustrated.

A second coiled compression spring 46 is disposed in the chamber 27 concentrically about the first compression spring 42 and has one end 47 bearing against the diaphragm cup 39 and the other end 48 bearing against diaphragm cup 34. Since the diaphragm cup 39 for the diaphragm 20 is fixed to the housing part 24 while the diaphragm cup 34 for the diaphragm 31 is movable with the diaphragm 31, the force of the compression spring 46 tends to maintain the diaphragm 31 against the stop surface 45 of the housing part 33 as illustrated in FIG. 1, but will permit the diaphragm 31 to move downwardly in opposition to the force of the compression spring 46 for a purpose hereinafter described when the pressure differential across the diaphragm 31 reaches a certain value.

In one embodiment of the valve positioner 10 of this invention, a third coiled compression spring 49 is adapted to be disposed in a chamber 50 of the actuator unit 13 that is defined between the housing part 33 and the upper diaphragm 31, the spring 49 having one end 51 bearing against the housing part 33 and the other end 52 thereof bearing against the diaphragm cup 36 whereby the force of the compression spring 49 tends to move the diaphragm 31 downwardly relative to the actuator unit 13 as will be apparent hereinafter.

The forces of the compression springs 42, 46 and 49 are so selected in relation to the effective areas of the diaphragm 20 and 31 that the valve positioner 10 can be made by the method of this invention to operate in a manner now to be described.

The valve positioner 10 can be utilized as an exhaust gas recirculation valve means for an internal combustion engine and the chamber 27 thereof can be interconnected to the engine manifold 30. In any event, when the chamber 27 is at atmospheric condition, the force of the compression springs 42 and 46 not only maintain the diaphragm 31 against the housing stop 45 in opposition to the force of the compression spring 49 in the manner illustrated in FIG. 1, but also the force of the compression spring 42 maintains the valve member 18 in its closed position against the valve seat 17.

However, as the vacuum condition in the vacuum source 30 thereof begins to increase and evacuate the chamber 27, a pressure differential begins to act not only across the diaphragm 20 in a direction to tend to move the diaphragm 20 upwardly in FIG. 1 in opposition to the force of the compression spring 42, but also to act across the upper diaphragm 31 in a direction to tend to pull the diaphragm 31 downwardly in FIG. 1 in opposition to the force of the compression spring 46.

Figure 2:
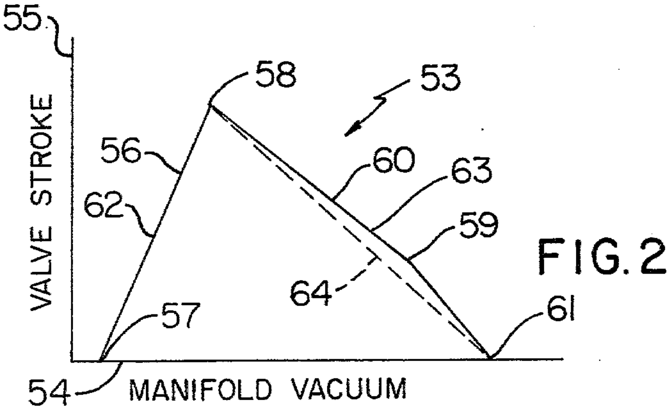
FIG. 2 is a graph illustrating the valve stroke operation of the valve positioner of FIG. 1 as the vacuum signal thereto increases through a certain range thereof.

As illustrated in FIG. 2, a schematic graph is generally indicated by reference numeral 53 wherein the X axis 54 represents the manifold vacuum value as the same increases in inches of mercury from left to right and the Y axis 55 represents the opening stroke of the valve member 18 relative to the valve seat 17 in tenths of inches, the full line 56 of FIG. 2 representing the movement of the valve member 18 relative to the valve seat 17 during the operation of the valve positioner 10 of this invention.

For example, the forces of the compression springs 42, 46 and 49 are so chosen that the diaphragm 20 will not begin to move upwardly in opposition to the force of the compression spring 42 until the vacuum value in the chamber 27 is approximately 1 inch Hg as represented by the point 57 on the graph 53 of FIG. 2. As the vacuum value in the manifold 30, and thus, in the actuator chamber 27 of the actuator unit 13, increases from approximately 1 inch Hg to approximately 5 inches Hg as represented by the point 58 on the graph 53, the diaphragm 20 progressively moves upwardly to open the valve member 18 relative to the valve seat 17 to its fully opened position wherein the maximum amount of exhaust gas is recirculated from the inlet 15 to the outlet 16 for the particular combustion engine for which the valve positioner 10 is designed. As the vacuum value further increases from approximately 5 inches Hg to approximately 12 inches Hg as represented by the point 59 on the graph 53, the diaphragm 31 is pulled downwardly in opposition to the force of the compression spring 46 by the pressure differential acting across the diaphragm 31 and thereby compresses the inner spring 42 to increase the force of the inner spring 42 tending to move the diaphragm 20 downwardly in opposition to the force of the pressure differential acting across the diaphragm 20 so that the net result is that the valve member 18 is moved closer to the valve seat 17 as represented by the portion 60 of the line 56 between the points 58 and 59 of the graph 53 of FIG. 2. During this increase in the vacuum value in the vacuum chamber 27, the force of the compression spring 49 is acting on the diaphragm 31 in the manner to tend to move the same downwardly along with the pressure differential acting across the diaphragm 31. However, after the diaphragm 31 has been moved downwardly a certain distance, the force of the compression spring 49 ceases to exist as the spring 49 is now fully extended and such action takes place when the vacuum value is approximately 12 inches Hg as represented by the point 59 on the line 56 of FIG. 2. At this time, a further increase in the vacuum value in the chamber 27 from approximately 12 inches Hg to approximately 15 inches Hg, as represented by the point 61 on the graph 53, causes the valve member 18 to be moved closer to the valve seat 17 at a different angle than the angle of the portion 60 of the line 56 until the valve member 18 is fully seated against the valve seat 17 as represented by the point 61 on the graph 53. A reverse in vacuum value from 15 inches Hg to 1 inch Hg causes the valve stroke from point 61 to point 57 along line 56.

Therefore, it can be seen that the portion 62 of the line 56 between the points 57 and 58 on the graph 53 is substantially linear so that the valve member 18 moves relative to the valve seat 17 in a progressively increasing opening manner as the vacuum value in the chamber 27 increases from a first value thereof to a second value thereof and thereafter the valve member 18 is moved toward the valve seat 17 in substantially a linear manner as represented by the portion 63 of the line 56 between the points 58 and 61 on the graph 53 as the vacuum value in the chamber 27 further increases from the second value thereof to a third value thereof.

However, in another embodiment of the valve positioner 10 of this invention, the compression spring 49 is not utilized and a spring 46 with a different force is selected whereby the valve positioner 10 operates in exactly the manner previously described except that when the pressure differential across the upper diaphragm 31 is at the value represented at the point 58 on the graph 53 of FIG. 2, a further increase in the vacuum value in the chamber 27 causes the diaphragm 31 to move downwardly in opposition to the force of the compression spring 46, without the assist of the compression spring 49, and act on the compression spring 42 in such a manner that the valve member 18 will close against the valve seat 17 in substantially a linear manner as represented by the dashed line 64 of the graph 53 of FIG. 2.

Nevertheless, whether the compression spring 49 is utilized or not, it can be seen that as the vacuum value increases from the second value thereof to a third value thereof, the action of the valve member 18 closing toward the valve seat 17 is substantially linear.

Therefore, it can be seen that by making the valve positioner 10 according to the method of this invention and by selecting the spring rates for the springs 42 and 46, as well as for the spring 49 if utilized, an improved valve positioner 10 of this invention will be provided wherein the same will cause the actuator means thereof to progressively open the valve member as the signal thereto progressively increases from a first value to a second value and thereafter to progressively close the valve member as the signal progressively increases from the second value to a third value. In this manner, the amount of fluid permitted to flow through the valve unit thereof progressively increases as the value of the signal progressively increases from the first value thereof to the second value thereof and then progressively decreases as the value of the signal further progressively increases from the second value thereof to the third value thereof and such an arrangement has been found to be satisfactory for controlling the exhaust gas recirculation for an internal combustion engine for an automobile or the like.

Accordingly, not only does this invention provide an improved valve positioner, but also this invention provides an improved method of making such a valve positioner or the like.

While the form and method of this invention now preferred have been illustrated and described as required by the Patent Statute, it is to be understood that other forms and method steps can be utilized and still fall within the scope of the appended claims.

What is claimed is:

1. In a self-contained valve positioner having a single valve positioner housing including an actuator portion and having a pneumatically operated actuator means therein carrying a main valve member to position said main valve member relative to a main valve seat in a valve unit in relation to the magnitude of a single pneumatic signal directed to said valve positioner and being utilized as the fluid source therein for pneumatically operating said actuator means, said actuator means having means in said housing to cause said actuator means to progressively open said valve member as said signal being directed to said valve positioner progressively increases from a first value to a second value and thereafter to progressively close said valve member as said signal being directed to said valve positioner progressively increases from said second value to a third value, said actuator means including a first flexible diaphragm operatively interconnected to said main valve member and being movable in relation to the pressure differential acting across the same, said means of said actuator means comprising a second flexible diaphragm not attached to said main valve member, said first diaphragm and said second diaphragm being spaced from each other and defining a chamber therebetween that receives said pneumatic signal therein, a first compression spring disposed in said chamber and having opposed ends respectively acting on said first diaphragm and said second diaphragm, the improvement comprising a second compression spring disposed in said chamber and having opposed ends, one of said ends of said second spring bearing against said housing and the other of said ends of said second spring acting on a retaining means on said second diaphragm such that said second diaphragm is moved toward said valve member against the bias of both said first and second compression springs as said signal increases from said second value to said third value.

2. A valve positioner as set forth in claim 1 and including a third compression spring disposed outside of said chamber and having opposed ends, one of said ends of said third spring bearing against said housing and the other of said ends of said third spring acting on said second diaphragm in a direction to tend to close said valve member.

* * * * *